United States Patent Office 3,495,988
Patented Feb. 17, 1970

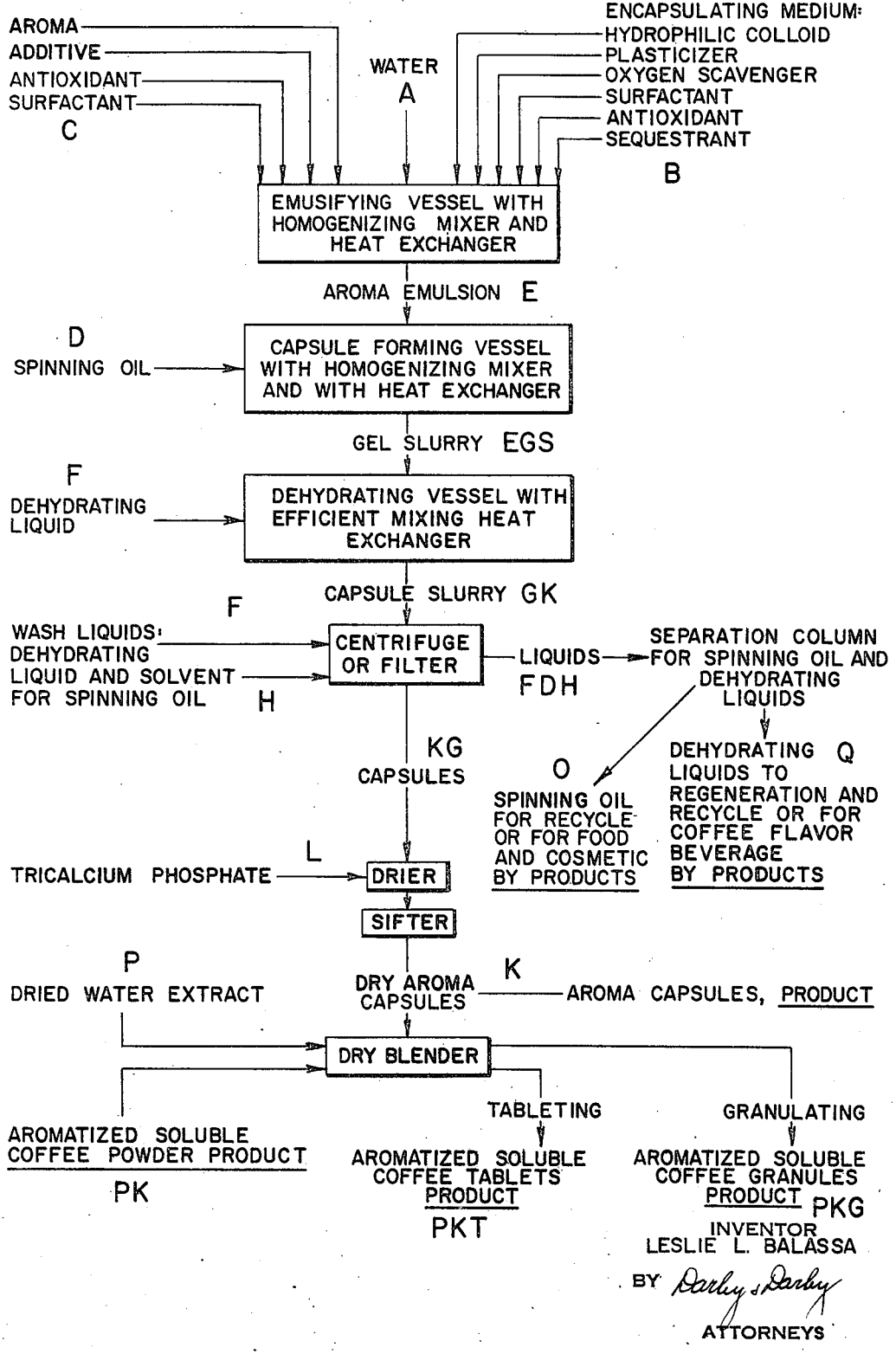

3,495,988
ENCAPSULATION OF AROMAS AND FLAVORS
Leslie L. Balassa, Tomahawk Lake,
Blooming Grove, N.Y. 10914
Continuation-in-part of application Ser. No. 348,325,
Mar. 2, 1964. This application Mar. 6, 1968, Ser.
No. 719,816
Int. Cl. A23l 1/22
U.S. Cl. 99—71                               19 Claims

ABSTRACT OF THE DISCLOSURE

The encapsulation and stabilization of a variety of organic chemical substances is described which comprises dispersing the material to be encapsulated in an aqueous hydrophilic colloid solution to form an emulsion, adding the colloid solution to a spinning liquid which under the process conditions forms a slurry with the emulsion and thereafter dehydrating the resulting slurry to form stabilized capsules which protect the encapsulated material against changes in its chemical and physical properties upon storage and exposure to oxygen. Included among the class of materials that may be encapsulated are aromas, flavors, vitamins, aroma bearing materials, flavor bearing materials, etc.

---

This application is a continuation-in-part of my copending application Ser. No. 348,325 filed Mar. 2, 1964, now abandoned.

This invention relates to processes for encapsulating materials subject to changes in their chemical and physical properties upon exposure to autooxidation conditions.

The rapid deterioration of aromas, flavors, vitamins and the like on exposure to the atmosphere under normal conditions and as a result of storage is well known. For example, the deterioration of the aroma of ground roasted coffee and the aroma of the aromatized soluble coffee products occurs rapidly in the presence of even traces of oxygen. This deterioration is recognized by the users of coffee as an unpleasant rancid or stale flavor and disagreeable taste within a day or two after the roasted ground coffee or aromatized instant coffee is in use with periodic opening and closing the containers, as is unavoidable in the case of normal use. Similarly, flavors or flavor bearing materials frequently lose their intensity as a result of flavor loss during storage and distribution of food products.

In general, the encapsulating processes that have been employed heretofore for protecting aromas, flavors, vitamins, aroma bearing materials and the like suffer from one or more disadvantages. Some processes use warm air for the dehydration of the encapsulated product. In such processes a thin film of spinning liquid remains on the surface of the capsules to prevent sticking of the capsules and oxidative chemical deterioration of the encapsulated material during the dehydration step. Such deterioration reduces the water solubility of the capsules. The formation of a thin film to overcome the foregoing problems during the encapsulating procedure generally requires the use of complicated process steps to assure that a thin film is formed and the presence of the film on the surface of the capsules substantially increases the time required to expel moisture incorporated in the capsules.

Accordingly, one aspect of the present invention relates to a process of encapsulating a variety of materials known in the art to require protection against changes in their chemical and physical properties which does not require the formation of a film on the surface of the capsules or the use of elevated temperatures to dehydrate the capsules.

Another aspect of the present invention relates to the encapsulation of aromas, flavors, vitamins or materials containing the foregoing using a hydrophilic colloid material which is substantially non-reactive wth aldehydes.

Yet another aspect of the present invention relates to the encapsulation of aromas, flavors, vitamins, aroma bearing materials, flavor bearing material and the like employing a mixture of an alcohol and an alcohol soluble material which is immiscible in the hydrophilic colloid emulsion but miscible with the dehydrating liquid used for dehydrating the capsules.

A still further aspect of the invention relates to an encapsulation process which is carried out at temperatures substantially below the temperatures heretofore required for carrying out such processes.

One preferred embodiment of the present invention relates to a method of protection of coffee aroma from loss by evaporation and from the deleterious effects of oxygen and to the preparation of fully aromatized soluble coffee products which maintain their freshly brewed coffee flavor in the cup, even after the products have been exposed to atmospheric oxygen for an extended period of time.

These and other aspects of the present invention will become apparent from the following description.

As used herein, the term "capsule" includes a composite package containing the active material, e.g. aromas, flavors, vitamins, or other material to be protected against deterioration and/or volatilization upon storage or exposure to oxygen, encased within a protective coating.

The encapsulating medium used in the process of the present invention is an aqueous hydrophilic colloid which may have as its sole major component a protein-based material such as gelatin, casein, soy protein or other vegetable or animal protein or proteins which are capable of forming colloidal dispersions in water, which can be gelled either by changes in temperature or by changes in concentration and which when dehydrated form a substantially air-impervious capsule. Preferably, however, the sole or major component of the hydrophilic colloid is a non-protein based material such as a vegetable gum, e.g. gum arabic, gum tragacanth, locust beam gum, etc. These vegetable gums will not react with aldehydes contained in aromas, flavors, etc. and therefore are preferable to a protein material as the major component of the capsule wall. Moreover, it has been found that the encapsulating process can be carried out at substantially lower temperatures when using a vegetable gum than if a protein material such as gelatin is used. Operating at lower temperatures minimizes degradation or loss of flavor quality during processing of aromas, flavors and the like. The hydrophilic colloid may also comprise a material such as cellulose and starch ethers, solubilized cellulose and starch products, carboxy-polymethylenes, styrene maleic acid reaction products, polyvinyl alcohols, polysaccharide B–1459 and dextran.

The molecular structure and the solubility characteristics of the hydrophilic colloids useful in carrying out this invention, may be modified by mechanical, chemical or biological means. Thus, they may be treated with acids, alkalis, they may be halogenated or exposed to manipulation with mechanical shear, or high pressure, or to sonic, supersonic or high energy radiant waves or they may be degraded or increased in polymer size through enzymatic, bacterial or fungal action.

The composition of the capsule wall may also be modified through the addition of other water soluble or dispersible nonpolymeric materials, such as glycerol, propylene glycol, sorbitol, mannitol, corn sugar, D-glucose, sucrose, lactose, ascorbic acid and its salts.

To facilitate the emulsification of the material to be encapsulated in the colloid solution and to control the particle size of the emulsion and the size of the particles in the slurry in the spinning oil, I have found it advantageous to include in the capsule composition a non-foaming or low foaming type of a surfactant such as polyoxyethylene (20) sorbitan monooleate or polyoxyethylene (20) sorbitan monolaurate.

Coffee aroma and other aroma and flavor bearing materials are rapidly degraded by even traces of oxygen. Therefore, it is desirable to carry out all operations in an inert atmosphere which involve the handling of the aroma or flavor and the handling of the particles in the slurry until they have been completely dehydrated. However, even with the foregoing precautions the water, the hydrophilic colloid and the other ingredients of the capsule are apt to introduce some oxygen into the emulsion. Consequently, in order to preserve the fresh flavor and intensity of the aroma or flavor during the encapsulation process and to provide additional protection after encapsulation, I have found it advantageous to add to the hydrophilic colloid solution an oxygen scavenger such as sodium bisulfite; a sequestrant for metal ions, such as sodium citrate; and an antioxidant, such as sodium ascorbate or sodium erythrobate.

The stability of the encapsulated aroma or flavor can be further increased by incorporating into the aroma or flavor constituents an antioxidant before such material is emulsified in the colloid solution. I found that the most effective and useful antioxidants are butylated hydroxytoluene and butylated hydroxyanisole, used either by themselves or in combination with each other or with other antioxidants, such as propyl gallate. The quantity of the antioxidants incorporated into the capsules depends on the stability requirements of the products in use and is limited only by their effect on the flavor of the final product.

When encapsulating an aroma material e.g. coffee aroma, it is preferred to prepare the aroma emulsion in a closed vessel and in an inert gas atmosphere. It is important to operate the homogenizing mixer in such a manner as to avoid entraining any inert gas into the emulsion. If gas is entrained, it will form bubbles in the colloid solution and will cause the formation of porous capsules which retain tenaciously the spinning oil and the dehydrating liquid in their pores. In addition, such porous capsules have a lower stability.

Where the capsule wall is to be formed of a protein material such as gelatin, it is preferred that the temperature of the emulsion be only about 5° C. higher than its gel point, just before it is to be introduced into the spinning oil. The best control is maintained over the size and the shape of the gel globules as the emulsion is being dispersed in the spinning oil, if the temperature of the spinning oil is not more than about 5° C. lower than the gel point of the emulsion and if it is maintained at about the temperature during the dispersion of the emulsion and the preparation of the slurry. Wider variations of temperature between the emulsion and the spinning oil are permissible and result in usable capsules, but require such close control of the speed and shear in the operation of the mixer that it is only rarely feasible.

When the capsule wall is to be formed of a non-protein material such as gum arabic, the temperature of the emulsion is preferably maintained between 0° and about 20° C. At this low processing temperature there is very little danger the volatile aroma or flavor will suffer degradation or loss of flavor quality. In contrast using gelatin to form the hydrophilic colloid requires the temperature of the emulsion to be about 40° C. (gel point of gelatin is 35° C.) prior to introduction of the emulsion in the spinning oil.

While I prefer, both for the preparation of the emulsion and for its dispersion in the spinning oil, a closed turbine type mixing device which may be converted to open turbine operation which is known as the Barrington Convertible Jet Mixer, other types of high shear mixers may be used.

The main requirements for the spinning oil which is used in the carrying out of this invention are the following: (1) remain liquid at the spinning temperature, (2) have a viscosity substantially higher than water, to be soluble in the flavor or aroma emulsion, (3) not be a solvent for the emulsion, (4) non-toxic, (5) not impart undesirable odor, taste, flavor or color to the capsules, (6) be readily and completely removable by the cold anhydrous dehydrating liquid or by a volatile hydrocarbon solvent, and (7) be readily separated from the dehydrating liquid.

The preferred spinning oils comprise a mixture of an anhydrous alcohol with a material which is mutually soluble with the alcohol. Among the materials suitable for this purpose are esters of polyhydric alcohols; mono, di and triglycerides; oxidized oils, etc. The preferred alcohol soluble material is castor oil. However, materials such as hydrogenated castor oil, blown linseed oil, sorbitol mono and diesters, e.g. sorbitol monoricinoleate, sorbitol diricinoleate; pentaerythritol 12-hydroxy stearate, diethylene glycol monoricinoleate, propylene glycol monoricinoleate, etc. are suitable. The castor oil or other selected material is diluted with anywhere from 5 to 40% by weight of alcohol in which it is soluble, e.g. anhydrous ethanol. A preferred admixture comprises 80 percent castor oil and 20 percent alcohol.

The use of a mixture of castor oil or other alcohol soluble material admixed with alcohol and having a viscosity up to 7000 cps. permits the formation of a capsule slurry which, after dehydration produces capsules having a size between 40 and 200 microns. Thus, it was possible to form relatively larger capsules because the alcohol present in the castor oil dehydrated the surface of the capsules sufficiently to protect them against coagulation at the relatively low spinning velocities and relatively low viscosity necessary to obtain large capsules (i.e. 40 to 200 micron).

Instead of the foregoing alcohol soluble spinning oils, materials such as edible oils or mineral oils may be used alone. These materials are insoluble in lower alcohols ($C_1$ to $C_4$). For example, in encapsulating coffee aroma, coffee oil may be used as the spinning oil. Also suitable are corn oil, peanut oil, soy oil, rape seed, white mineral oil and odor free kerosene.

The quantity of spinning oil used in the process is not critical. It should be at least equal in volume to the volume of the aroma, flavor or vitamin bearing emulsion to be dispersed in it. Larger quantities of the oil may be employed to good effect.

For the dehydration of the capsule slurry formed in the spinning oil, $C_1$ to $C_4$ alcohols are the most suitable though other hygroscopic liquids may also be employed and fall within the scope of this invention.

A preferred dehydrating liquid is ethanol as it is the least toxic of the alcohols suitable for carrying out this invention and, in addition, it is a good solvent for aroma materials such as coffee aroma and it can be readily separated from the spinning oils used. Ethanol which contains coffee aroma has a desirable fresh coffee bouquet and it provides an excellent base for coffee liqueurs, coffee brandies and other coffee flavored beverages or food flavor concentrates. Using ethanol as the dehydrating agent, a commercially valuable by-product is obtained and the expense of solvent recovery is reduced and, in the case of the ethyl alcohol, may be completely eliminated.

Other dehydration liquids, such as isopropanol n-propanol, or acetone may be used to good effect in place of ethanol.

The capsules may be separated from the spinning oil and the dehydrating liquid by either centrifuging, filtering, decanting, straining or any combination of these. The separated capsules may be washed with a solvent for the spinning oil and with the dehydrating liquid until the surface of the capsules are free of the spinning oil.

The selection of a suitable washing solvent for the dehydrated capsules is dependent on the spinning oil used. Thus, where the spinning oil is a mixture of castor oil with anhydrous alcohol or other alcohol soluble material, as previously described, the dehydrated capsules separated from the dehydrating solution may be washed with anhydrous ethanol to remove completely the castor oil. Since no solvent other than ethanol need be used to remove the castor oil, the capsules have no solvent odor such as sometimes occurs with the capsules obtained by using alcohol insoluble spinning oils. These latter type of spinning oils must be removed from the capsules with a non-alcoholic solvent such as hexane.

A preferred embodiment of my invention involves the encapsulation of coffee aroma. In such process there is used the aroma constituents of coffee completely or partially freed from the coffee oils which are the fat constituents of the coffee beans. In the separation of the aroma constituents from the fat any suitable means may be employed, such as vacuum distillation in thin film evaporators of the falling film or the wiped film type or molecular distillation as described in U.S. Patent No. 2,563,233.

The aroma may also be separated from the fat by extracting a non-polar, hydrocarbon extract of the roasted beans with a polar solvent in which the aroma is preferentially soluble and then separating the aroma from the polar solvent by distillation. In such separation processes, in order to prevent or at least to lower the loss of aroma by co-distillation with the solvents, especially in the final stages of the distillation, it is preferred to add to the polar solvent solution of the aroma in the still, either during or prior to the distillation, a small quantity of a high boiling solvent for the aroma which is capable of retarding the evaporation of the aroma during the critical final state of the removal of the solvent. I found that either a small amount of the coffee oil or propylene glycol added to the aroma solution will assist in retaining most of the aroma in the still during the final stage of the distillation of the solvent, without imparting an objectionable odor or taste to the aroma concentrate and without interfering with the encapsulation process to follow. Other vegetable oils and fats, fatty acid mono- or diglycerides, glycerol or even sorbitol may be utilized for the "fixing" or retention of the aroma constituents in the still in place of the coffee oil or propylene glycol.

If freshly roasted coffee is used in the extraction processes and if both the extraction and the distillation steps are carried out at a low temperature, preferably below 50° C. and in an inert atmosphere, the aroma concentrate obtained has the typical and pleasing aroma of freshly ground roasted coffee.

For the dried water extract there may be used the extract prepared from the solvent extracted ground coffee by extraction with hot water under pressure. The initial ground coffee extract is first freed from suspended particles by any suitable means, such as by centrifuging, filtering, settling and decanting, etc. The extract is then concentrated and dried, or dried without further concentration, by means of any suitable equipment, such as spray driers, vacuum tray or belt driers or even drum driers, operated either at atmospheric or at reduced pressure, depending on the taste, flavor, density and/or texture of the dried product desired.

The following detailed examples of the compositions and the methods which may be employed in accordance with the invention are recited as illustrative and it is to be understood that the invention is not intended to be limited thereby.

EXAMPLE 1

Preparation of coffee aroma concentrate

An alcohol extract of roasted coffee was prepared at 60° C., in accordance with the teachings of U.S. Patent 2,481,470. The separation of the coffee oil from the aroma and from the alcohol solvent was accomplished by diluting the alcohol extract with water (or preferably with water diluted alcohol) to the point where it became cloudy as a result of the incipient precipitation of the coffee oil. This cloud point was established at about 35° C. The temperature of the cloudy solution was then lowered to about 15° C. to effect the separation of the coffee oil from the alcohol/aroma/water solution. The coffee oil was then completely removed by centrifuging.

The water and most of the alcohol were removed by azeotropic distillation at reduced pressure. When the volume of the liquid remaining in the still reached to within three times the volume of the aroma present (e.g. as determined by conventional laboratory techniques including visual observation), coffee oil was added in a volume about equal to the aroma content. The pressure was then adjusted to about 100 mm. and the distillation continued at a temperature not exceeding 50° C. until all the alcohol solvent was removed with substantially all the aroma retained in the still with the added coffee oil.

The alcohol distillate contained no noticeable coffee odor or aroma, thus indicating that the addition of the coffee oil was effective in retaining in the still fractions of the aroma which are more volatile than alcohol and which would, otherwise, distill over with the alcohol. The aroma recovered from the still was 93% of the calculated theoretical value.

EXAMPLE 2

Coffee aroma concentrate

The aroma was extracted with alcohol, separated from the coffee oil and the alcohol stripped from the aroma constituents in the same manner as in the case of Example 1. The only difference was that different additives used in Examples 2–b through 2–h were introduced into the still to retain more of the aroma constituents without loss of the most valuable volatile fractions.

| Example | Additive | Weight ratio aroma additive | Recovered aroma calculated 100% |
| --- | --- | --- | --- |
| 2–a | None | 1/0 | 87 |
| 2–b | Coffee oil [1] | 1/2 | 96 |
| 2–c | Coffee essence [2] | 1/1 | 93 |
| 2–d | Propylene glycol | 1/1 | 92 |
| 2–e | do | 1/2 | 97 |
| 2–f | Glyceryl monooleate | 1/1 | 92 |
| 2–g | Glyceryl monopalmitate | 1/1 | 92 |
| 2–h | Polyoxyethylene (20) sorbitan monooleate. | 1/1 | 93 |

[1] The coffee oil used in this example was the oil recovered from the centrifuge. It was substantially free of aroma.
[2] The coffee essence used was obtained by pressing and expelling the oil and the aroma constituents from the roasted beans. The coffee essence contained 15% aroma and it was preserved by freezing it until the time it was used.

Encapsulation procedure

The flow of materials through the equipment used in the encapsulation process follows the general outline represented by the flow diagram which shows encapsulation of aromas. Water, de-ionized or distilled, was introduced into the emulsifying vessel.

The external phase B or encapsulating medium comprises the hydrophilic colloid or a combination of colloids and one or more of the following water soluble materials: plasticizer, oxygen scavenger, surfactant, antioxidant, antifoam.

In the preferred embodiment the hydrophilic colloid and the plasticizer were introduced into the emulsifying vessel containing the water while the closed turbine homogenizing high speed mixer is operated at a speed sufficient to keep the colloid from settling to the bottom or from sticking to the walls of the vessel. The temperature of the water was then raised to a point where the colloid will dissolve in the water in the shortest time without at the same time suffering irreversible structural or molecular changes. This is a particularly narrow range in the case of some of the gellable protein based colloids being generally below 75° C. and preferably between 65°–70° C. In the case of the not readily gellable non-protein base colloids, the temperature of the external phase is lowered to between 0° and 20° C.

When the colloid is dissolved, the oxygen is purged from the emulsifying vessel, employing an inert gas, such as nitrogen or $CO_2$, either of which may contain a small amount of $SO_2$, usually less than 0.1%.

The oxygen scavenger is then added followed by the surfactant and the antioxidant if they are called for in the formula.

The internal phase C comprises the material to be encapsulated with or without additives, antioxidant and surfactant. Except for the additive, which may be water soluble and which therefore will become part of the external phase, all ingredients are essentially water insoluble but under the conditions dispersible in B to form the internal phase of the emulsion.

In carrying out this step, the temperature of the external phase composition B (the encapsulating medium) in the emulsifying vessel is lowered to within 10° C. of the gel point of phase B if a gellable colloid (e.g. gelatin) is used. When a not readily gellable colloid (e.g. vegetable gum) is used in the external phase the temperature of the external phase composition is lowered below 20° C. and preferably between 0° to 10° C. Then the internal phase composition C is added, preferably with all the ingredients premixed, at a rate consistent with the ability of the homogenizing mixer to incorporate it into B. When all of C has been added the speed of the mixer is increased to full homogenizing speed and the baffle of the mixer is adjusted in such a manner as to prevent foaming or entrainment of gas. When the particle size of C has been reduced to about one micron (e.g. 0.01 to 2.0 microns), the temperature of the emulsion is reduced to about 5° C. above the gel point of the emulsion E in the case of a gellable hydrophilic colloid.

The spinning oil D is introduced into the capsule forming vessel and the temperature of the oil is adjusted to about 5° C. below the gel point of the emulsion E when using a gellable hydrophilic colloid and adjusted to between 0° and 20° C. where the spinning oil is a mixture of castor oil and anhydrous alcohol and the hydrophilic colloid is a non-protein based material. The homogenizing mixer is activated and the heat exchanger is adjusted to hold the temperature to compensate for the heat generated by the mixer and for the temperature increase that would accompany the introduction of the emulsion which at this point is about 10° C. higher in the case of a gellable colloid.

While the homogenizing mixer is operated at the speed and at a rotor/stator setting which will result in a slurry dispersion of the desired particle size, E is introduced into the capsule forming vessel at a rate consistent with the ability of mixer to incorporate it into D, thereby forming a gel or capsule slurry EGS. The dehydrating liquid F is introduced into the dehydrating vessel and its temperature adjusted to about 15° C. below the gel point of E when using a gellable based colloid and between 0° to 20° C. where the colloid is not readily gellable. The mixer is activated and run at a speed sufficient to prevent particles of EGS from settling to the bottom of the vessel.

EGS is now introduced into the dehydrating vessel and mixed with dehydrating liquid F for a sufficient length of time, usually between 30 and 60 minutes, to effect a degree of dehydration where the particles KG, formed as a result of dehydration of the slurry, will not adhere to each other at ambient temperatures, even after the complete removal of the spinning oil D in the centrifuge or pressure filter.

After the slurry EGS has been dehydrated to the desired degree, the resulting capsule slurry, GK, is separated from liquids FDH in a centrifuge and while still in the centrifuge it is washed with liquids F and H to assure the complete removal of the spinning oil and any other solvent soluble material, e.g. aroma constituents, which eliminates any possibility of the development of off-flavor due to oxidation of residual aroma on the surface of capsules K.

Dehydrated capsules KG from the centrifuge may be transferred to a drier while they are being dusted with tricalcium phosphate to assure that the individual capsules will not adhere to each other during the elevated temperature drying operation. The drier is operated preferably below 50° C. and at partial vacuum to prevent the formation of vapor blisters in the capsules. When the moisture content of the capsules K drops to below the equilibrium moisture content of the composition, the drying cycle is terminated and the capsules are put through a sifter to free them from most of the loosely adhering tricalcium phosphate. This drying operation is optional inasmuch as the dehydrating liquid substantially dehydrates the capsules. The resulting capsules K represents the stabilized aroma, flavor, or other material to be protected against deterioration and/or volitalization having a size of about 1 micron to about 200 microns.

There are usually 10–20 active particles per final product but it is possible to have even hundreds of active particles in the capsule.

If the active material has a diameter equal to X then the wall around the active material is about 2X to 10X.

Dried water extract P and aroma containing capsules K may be blended in the required proportions to result in a fully aromatized soluble coffee powder, PK.

Putting PK through a suitable tabletting operation results in soluble tablets of any desirable shape and solubility characteristics.

Putting PK through a suitable granulator, soluble aroma granules are obtained.

Flavored beverage base Q from dehydrating liquids may be obtained as a by-product and which may be used in flavored beverages or food flavor concentrates or may be recycled for use again in F.

The following examples illustrate the encapsulation procedure detailed above.

EXAMPLE 3

Equipment

Jacketed stainless steel vessels equipped with top entering homogenizing mixer (Barrington Convertible Jet Mixer, Model BJ–2B) and tightly fitting covers. The covers are provided with means for the introduction of the materials and for the inert gas.

Procedure 180 grams of distilled water of ambient room temperature was introduced into the mixing vessel. The mixer was then activated and the shaft speed adjusted to about 5–600 r.p.m. 100 grams of granulated calf skin gelatin (150 Bloom Gelometer grade) was added, followed by 50 grams of propylene glycol. The baffle plate of the mixer was lowered to below the surface of the liquid in the vessel in order to prevent the formation of gas bubbles during mixing. The temperature of the content of the vessel was raised to 70° C. by means of circulating hot water in the jacket. The speed of the mixer was then increased to about 2000 r.p.m. and the mixing continued for 25 minutes when gelatin was completely dipersed, forming a homogeneous solution in the liquid medium.

The temperature of the batch was lowered to 40° C. (gel point of the gelatin solution 35° C.), the air in the vessel was displaced by nitrogen and 0.7 gram sodium bisulfite and 3.0 grams sodium citrate was added and dissolved in the batch. 50 grams of vacuum distilled coffee aroma was added to the batch, taking care not to expose it to contact with atmospheric oxygen. The speed of the mixer was increased to about 6000 r.p.m. while the baffle plate was lowered sufficiently to prevent entrainment of nitrogen bubbles into the batch.

The mixing was continued for 15 minutes, when a sample withdrawn from the vessel and examined under the microscope showed an average particle size for the emulsion one micron. The temperature during mixing was maintained at about 40° C., with cooling water circulating through the jacket of the vessel at a rate sufficient to compensate for the heat generated by the operation of the mixer.

Into a second mixing vessel, similar in every respect to the one used in the preparation of the aroma emulsion, 300 grams of coffee oil was introduced and the temperature of the oil was brought to 30° C. The homogenizing mixer, now operated as an open turbine unit without the turbine shroud, was activated and its speed adjusted to about 4000 r.p.m. The air in the vessel was replaced by nitrogen and the baffle plate of the mixer was raised high above the surface of the oil so as to expose the vortex formed by the action of the mixer. The aroma emulsion was then introduced into the center of the vortex, at a uniform rate within a period of two minutes.

The baffle plate of the mixer was then lowered below the surface of the batch and the mixing continued for ten minutes. A sample withdrawn showed an average of 70 microns particle size for the aroma gel slurry in the oil which was considered satisfactory.

The temperature of the batch was held between 30° and 35° C. throughout the mixing and slurrying operation.

A jacketed vessel equipped with a propeller type mixer was used as the dehydrating vessel.

3000 cc. ethanol 95.5% was introduced into the dehydrating vessel. The temperature of the alcohol was adjusted to about 20° C., the mixer was activated and its speed adjusted to about 400 r.p.m. The gel slurry was introduced in a steady stream, in a period of five minutes. The mixing continued for 35 minutes, when the gel capsules showed the desired degree of dehydration as determined by their firmness on pressing them with a spatula against a glass plate.

The capsules were separated from the dehydrating liquid and most of the coffee oil by centrifuging.

The capsules in the centrifuge were washed with 300 cc. hexane followed by 100 cc. ethanol 95.5%, both at a temperature of 20° C.

The dehydrated washed capsules were transferred into a shallow pan, dusted with about 5 grams of powdered tricalcium phosphate.

The capsules were dried in a vacuum oven at 30° C. and at 100 mm. pressure, to a moisture content of 5%.

The capsules were sifted free of the major part of the loosely adhering tricalcium phosphate.

5 grams of the capsules mixed with 95 grams of powdered water extract of aroma free roasted coffee grounds resulted in an aromatized soluble coffee product which when added to hot water in the desired concentration resulted in a beverage equal to a high grade freshly brewed coffee.

The aromatized soluble coffee product was formed into tablets by means of a conventional tabletting machine and also granulated with a suitable equipment.

The tabletted and the granulated material gave a brewed coffee of equal flavor and taste properties as was obtained with the powder.

Following the procedure detailed in Example 3, the following examples were carried out employing the described ingredients. In this specification, percentages and ratios are by weight unless otherwise stated:

EXAMPLE 4

A: 100 grams of water
B: Encapsulating medium—
  Hydrophilic colloid—100 grams of gelatin, calf skin—150 bloom
  Plasticizer—50 grams of propylene glycol
  Oxygen scavenger—0.7 gram sodium bisulfite
  Antioxidant—25 grams of sodium ascorbate sequestrant—3 grams of sodium citrate
C: Aroma constituent—50 grams of aroma, vacuum distilled from coffee essence
D: Spinning oil—600.0 grams of coffee oil
F: Dehydrating liquid—3000.0 cc. ethanol (95.5%)
H: Wash liquid and solvent for spinning oil—300 cc. hexane and 150 cc. additional ethanol
K: Aroma capsules—22% aroma content
PK: Aromatized soluble coffee—94.3% of water extract and 5.7% of aroma capsules
PKT: Aromatized soluble coffee tablets—94.3% of water extract and 5.7% of aroma capsules
PKG: Aromatized soluble coffee granules—94.3% of water extract and 5.7% of aroma capsules

EXAMPLE 5

The same ingredients were employed as in Example 4 and in the same quantities, with the following changes:

5 grams of butylated hydroxytoluene were added to the aroma constituent as an antioxidant:

K: Aroma capsules—21.5% aroma content
PK: Aromatized soluble coffee 94.2% water extract and 5.8% aroma capsules
PKT: Aromatized soluble coffee tablets—94.2% water extract and 5.7% aroma capsules
PKG: Aromatized soluble coffee granules—94.2% water extract and 5.8% aroma capsules

EXAMPLE 6

The ingredients of Example 5 were employed in the same quantities with the following changes:

The 50 grams of propylene glycol plasticizer added to the encapsulating medium in Examples 3 through 5 was omitted and instead added to the aroma constituent as an additive.

The aroma content of the aroma capsules K and the percentage of water extract and aroma capsules in the aromatized soluble coffee was the same as in Example 5.

EXAMPLE 7

The ingredients of Example 5 were employed in the same quantities with the following changes:

B: Surfactant—3.0 grams of polyoxyethylene (20) sorbitan monooleate were added to the encapsulating medium The aroma content of the aroma capsules K and the percentage of water extract and aroma capsules in the aromatized soluble coffee was the same as in Example 5.

EXAMPLE 8

The composition of Example 7 with the following change:

The aroma constituent was 50 grams of the aroma concentrate prepared according to Example 2-a.

EXAMPLE 9

A composition similar to Example 7 with the following changes:

The aroma constituent was 100 grams of the aroma concentrate prepared according to Example 1.
3.3 grams of polyoxyethylene (20) sorbitan monolaurate were added to the aroma concentrate as a surfactant.

EXAMPLE 10

The composition of Example 9 with the following change:

The aroma constituent was 100.0 of the aroma concentrate prepared according to Example 2-c.

EXAMPLE 11

The composition of Example 7 with the following changes:

100 grams of gelatin, pigskin—50 bloom were used as the hydrophilic colloid.
The aroma constituent was 100.0 grams of the aroma concentrate prepared according to Example 2–c.
The spinning oil was 600.0 grams of white mineral oil.
The dehydrating liquid was 3000.0 cc. of isopropanol.

EXAMPLE 12

The composition of Example 11, with the following changes:

100 grams of casein, ammoniated, were used as the hydrophilic colloid.
50 grams of sorbitol were used as the plasticizer.

While the aroma content of capsules K varied in Examples 8 through 12, the aroma content of the soluble coffee powder was adjusted in each case to be as close as possible to 1.25%, the same was true of PKG granules and PKT tablets.

EXAMPLE 13

One-half gram of polyoxyethylene sorbitan monooleate and 100 grams of gum arabic are dissolved in 100 grams distilled water. This solution is cooled to about 10° C. To the resulting colloidal solution there is added 33.3 grams of orange oil (cold pressed) which is emulsified in the colloidal solution by the use of a high speed turbine mixer.

The resulting emulsion is added to a mixture of 500 grams castor oil and 250 grams ethanol in increments cooled to a temperature of about 10° C. while mixing with a turbine mixer at a speed adjusted to produce a coarse capsule slurry.

The capsule slurry is added to 2000 ml. of anhydrous ethanol which has previously been cooled down to 10° C. while the alcohol is being vigorously agitated by a turbine mixer. The capsule slurry is added to the anhydrous alcohol at a rate consistent with the ability of the mixer to incorporate rapidly the capsule slurry into the dehydrating alcohol. After the entire volume of the capsule slurry has been added the mixing is continued at a reduced speed for 20 minutes or until the capsules are completely dehydrated.

The dehydrated capsules have an average particle size of about 120 microns. The flavor quality of the freshly prepared capsules is excellent with a storage stability of about three months.

EXAMPLE 14

One-half gram polyoxyethylene sorbitan monooleate and 40 grams of sucrose are dissolved in 100 grams distilled water. This solution is cooled to about 8° C. To the resulting colloidal solution there is added 33.3 grams of orange oil (cold pressed) which is emulsified in the colloidal solution in accordance with the procedure described in Example 13.

The resulting emulsion is added to a mixture of castor oil and anhydrous ethanol and processed in the manner specified in Example 13 and the resulting capsule slurry dehydrated as indicated in that example. The flavor quality of the freshly prepared capsules is excellent with a storage stability of about four months.

EXAMPLE 15

One-half gram of polyoxyethylene sorbitan monooleate, 1 gram of ascorbic acid, 0.1 gram of ethylene diamine tetra acetic acid sodium salt and 0.3 gram of parahydroxy benzoic acid methyl ester are all dissolved in 100 grams distilled water. Thereafter 25 grams of crystalline sorbitol and 75 grams of gum arabic are added and the solution is cooled to about 10° C. To the resulting colloidal solution there is added 33.3 grams lemon oil in which there has previously been dissolved 0.01 gram butylhydroxy toluene which is emulsified in the colloidal solution by the use of a turbine mixer. The temperature of the emulsion is maintained at about 10° C. while the mixing is being carried out at a slow speed.

The resulting emulsion is added to a mixture of castor oil and anhydrous ethanol following the procedure described in Example 13 to form the capsule slurry. Thereafter the capsule slurry is dehydrated in the manner previously described. The dehydrated capsules have an average particle size of about 150 microns. The storage stability of the encapsulated material is in excess of 1 year.

EXAMPLE 16

Lemon oil capsules were prepared as described in Example 15. The capsules were reslurried in an alcohol solution of a high molecular weight of polyethylene glycol to produce a 1% coating on the capsules calculated on the basis of the dried capsules. The alcohol is evaporated from the capsules which are free flowing and of excellent water solubility characteristics. The coating did not change the organoleptic properties of the encapsulated flavor. The capsules had a storage stability of about 18 months.

EXAMPLE 17

Following the procedure described in the previous examples, coffee aroma may be encapsulated using gum arabic as the hydrophilic colloid and a mixture of castor oil and anhydrous ethanol as the spinning oil.

In order to demonstrate the greater stability achieved by encapsulation of the aroma constituents of coffee, according to the present invention, comparative tests were conducted. The results of the encapsulation with regard to the stability of the coffee aroma were determined by extended storage tests in partially filled containers at ambient room temperatures and in accelerated tests at 45° C. The controls in each case were prepared by using the same dried water extract and the same aroma constituents in the same concentration as present in corresponding capsules, resulting in a soluble coffee of equal aroma content. Control 1 contained only the aroma. Control 2 contained the aroma added unprotected as in case of Control 1 mixed with the corresponding blank, aroma free, capsules i.e. coatings without aroma contained therein. The controls were blended in an inert atmosphere, taking care to have the aroma evenly and completely blended with the water extract and with the aroma free capsules.

The stability tests, in partly filled containers, were carried out at 18–21° C. The containers were opened daily for one minute during the first fourteen days and five times (one minute at a time on separate days) each week during the entire test period. Each time the containers were opened a quantity sufficient to brew a cup of coffee was removed during the first fourteen days and thereafter at each test. However, even when no material was removed, each time the containers were opened their surface was disturbed with a spoon.

The flavor and the aroma of the materials was judged by brewing a cup of coffee at each test period.

The following ratings were used in the evaluation of the stability tests:

E: Excellent, equal to the freshly prepared material.
G: Good, slightly lacking in bouquet.
F: Fair, with a slight but detectable stale aroma.
S: Stale, readily noticeable stale aroma.
VS: Very stale, completely unacceptable even to the unsophisticated taste.

The tests were discontinued when any of the materials under test were judged to be very stale. Table I shows the results of the stability tests.

TABLE I.—STABILITY TESTS

|  | 1 day | 5 days | 14 days | 1 mo. | 2 mo. | 6 mo. | 9 mo. | 12 mo. |
| --- | --- | --- | --- | --- | --- | --- | --- | --- |
| Example 3, PK | E | E | E | E | E | F | S | VS |
| Control 1, PK | E | F | S | VS | * |  |  |  |
| Control 2, PK | E | F | S | VS |  |  |  |  |
| Example 4, PK | E | E | E | E | E | E | F | S |
| Control 2, PK | E | F | S | VS |  |  |  |  |
| Example 5, PK | E | E | E | E | E | E | E | E |
| Control 2, PK | E | F | S | VS |  |  |  |  |
| Example 6, PK | E | E | E | E | E | E | E | E |
| Control 2, PK | E | F | S | VS |  |  |  |  |
| Example 7, PK | E | E | E | E | E | E | E | E |
| Control 2, PK | E | F | S | VS |  |  |  |  |
| Example 8, PK | G | G | G | G | G |  | G | G |
| Control 1, PK | G | F | S | VS |  |  |  |  |
| Control 2, PK | G | F | S | VS |  |  |  |  |
| Example 9, PK | E | E | E | E | E | E | E | E |
| Control 1, PK | E | F | S | VS |  |  |  |  |
| Control 2, PK | E | F | S | VS |  |  |  |  |
| Example 10, PK | E | E | E | E | E | E | E | E |
| Control 1, PK | E | F | S | VS |  |  |  |  |
| Control 2, PK | E | F | S | VS |  |  |  |  |
| Example 11, PK | E | E | E | E | E | E | E | E |
| Control 1, PK | E | F | S | VS |  |  |  |  |
| Control 2, PK | E | F | S | VS |  |  |  |  |
| Example 12, PK | E | E | E | E | E | E | E | E |
| Control 1, PK | E | F | S | VS |  |  |  |  |
| Control 2, PK | E | F | S | VS |  |  |  |  |

Stability tests corresponding to Table I, run with PKT tablets and PKG granulated materials, gave results showing the same stability relationship but with the time of first noticeable stale development appearing in about 20 days and in case of Example 3 in about 12 months, indicating that tabletting and granulating alone increase the stability of the materials, presumably, because of the lowered surface exposure to air.

In the accelerated tests, conducted at 45° C., all the controls were rated S in 48 hours. Example 3 was rated S in 7 days. Example 4 was rated S in 14 days. Examples 5 to 12 remained E for about a month and became F in about 2 months time, except for Example 8, which was G for the first month but dropped to F about the same time as the rest of the series.

The following conclusions may be drawn from the results of the stability tests:

The usual soluble coffee merely aromatized with the aroma constituents of Examples 1 to 12 will turn stale within a short time.

Blank capsules added to the aromatized soluble coffee do not prevent the development of the stale flavor regardless of the composition of the capsules.

Tabletting and granulating the aromatized soluble coffee offers a limited but insufficient increase in the stability of the material.

Encapsulation of the aroma constituents in accordance with the present invention, even without the use of antioxidants, results in aromatized soluble coffee of about six months' stability under the conditions of the tests. Under identical conditions, with an antioxidant in the external phase, the stability further increased about 30%, with an antioxidant added in the internal phase also, the stability was more than doubled.

Although the present invention has been described in conjunction with preferred embodiments, it is to be understood that modifications and variations may be resorted to without departing from the spirit and scope thereof, as those skilled in the art will readily understand. Such variations and modifications are considered to be within the purview and scope of the appended claims.

What is claimed is:

1. A proces for protecting an ingestible material against alteration of its chemical and physical properties which comprises dispersing the material to be protected in an aqueous solution of a non-protein based hydrophilic colloid to form an emulsion, dispersing said emulsion in a non-toxic liquid which is insoluble in said emulsion and having a viscosity substantially higher than that of said aqueous solution to form a capsule slurry, said liquid comprising an admixture of an anhydrous aliphatic alcohol with a material selected from the class consisting of a triglyceride, diglyceride, monoglyceride, oxidized oil and an aliphatic ester of a polyhydric alcohol, adding said slurry to a dehydrating liquid capable of substantially dehydrating the particles in said slurry, said particles being converted to capsules as a result of said dehydration and separating said capsules from said dehydrating liquid and said liquid insoluble in said emulsion to recover said capsules.

2. A process according to claim 1 wherein the temperature of said emulsion is between about 0° and 20° C. prior to the dispersion of said emulsion in said liquid insoluble in said emulsion.

3. A process according to claim 1 wherein said non-toxic liquid comprises an admixture of a triglyceride with said anhydrous aliphatic alcohol.

4. A process according to claim 3 wherein said triglyceride is a castor oil and said aliphatic alcohol is ethanol.

5. A process according to claim 4 wherein said admixture contains from about 5 to about 40% by weight of said ethanol.

6. A process according to claim 1 wherein said dehydrating liquid is maintained at a temperature no greater than about 20° C.

7. A process according to claim 1 wherein said aqueous solution of said hydrophilic colloid contains a plasticizer.

8. A process according to claim 1 wherein said dehydrating liquid comprises ethanol.

9. A process according to claim 1 wherein said aqueous solution of said hydrophilic colloid contains an oxygen scavenger.

10. A process according to claim 1 wherein the formation of said emulsion, said slurry and the dehydration of said capsule particles is performed in an inert atmosphere.

11. A process according to claim 1 wherein said protected material is selected from the class consisting of coffee aroma and flavor oils.

12. A process for protecting an ingestible material against alteration of its chemical and physical properties which comprises dispersing the material to be protected in an aqueous solution of a natural gum to form an emulsion, dispersing said emulsion in a non-toxic liquid which is insoluble in said emulsion to form a capsule slurry, said liquid having a viscosity substantially greater than that of said aqueous emulsion, and said liquid comprising an admixture of an anhydrous aliphatic alcohol with a material selected from the class consisting of a triglyceride, diglyceride, monoglyceride, oxidized oil and an aliphatic ester of a polyhydric alcohol, adding said slurry to a dehydrating liquid capable of substantially dehydrating said slurry to thereby form capsules as a result of said dehydration and separating said capsules from said dehydrating liquid and said liquid insoluble in said emulsion to recover said capsules.

13. A process according to claim 12 wherein the temperature of said emulsion is between 0° and about 20° C. prior to the dispersion of said emulsion in said liquid insoluble in said emulsion, said liquid insoluble in said emulsion having a temperature between about 0° and 20° C. prior to the dispersion of said emulsion in said liquid and wherein the temperature of said dehydrating liquid is maintained at a temperature no greater than 20° C. during said dehydration step.

14. A process according to claim 13 wherein said non-toxic liquid comprises a mixture of an anhydrous alcohol with castor oil, said alcohol constituting less than 50% of said mixture.

15. A process according to claim 14 wherein said capsules separated from said dehydrating liquid have an average size of about 40 to about 200 microns.

16. A process for protecting an ingestible material against alteration of its chemical and physical properties which comprises dispersing the material to be protected in an aqueous solution of a protein-based hydrophilic colloid to form an emulsion, dispersing said emulsion in a non-toxic liquid which is insoluble in said emulsion and having a viscosity substantially higher than that of said aqueous solution to form a gel slurry, the temperature of said emulsion being about 5° C. higher than the gel point of said emulsion prior to the dispersion of said emulsion in said liquid insoluble in said emulsion, adding said slurry to a dehydrating liquid capable of substantially dehydrating the particles in said slurry, said dehydrating liquid being maintained at a temperature of at least 15° C. below the gel point of said emulsion in said slurry, said particles being converted to capsules as a result of said dehydration and separating said capsules from said dehydrating liquid and said liquid insoluble in said emulsion to recover said capsules.

17. A process according to claim 16 wherein said protein based material is gelatin.

18. A process according to claim 16 wherein said liquid insoluble in said emulsion is maintained at a temperature of no more than about 5° C. lower than the gel point of said emulsion during the dispersion of said emulsion in said insoluble liquid.

19. A process according to claim 16 wherein said aqueous solution of said hydrophilic colloid is obtained by dissolving said hydrophilic colloid in water at a temperature substantially above the gel point of said hydrophilic colloid.

References Cited

UNITED STATES PATENTS

| | | | |
|---|---|---|---|
| 1,201,133 | 10/1916 | Askenasy | 99—130 |
| 2,183,053 | 12/1939 | Taylor | 99—11 |
| 2,691,619 | 10/1954 | Bayley et al. | 99—11 X |
| 2,947,634 | 8/1960 | Feldman et al. | 99—7 |
| 3,137,630 | 6/1964 | Hecker et al. | 99—11 X |
| 3,143,475 | 8/1964 | Koff et al. | 99—11 X |

OTHER REFERENCES

Gregory, T. C.: Uses and Applications of Chemicals and Related Materials, 1944, Reinhold Publ. Co., N.Y., pp. 334–335.

MAURICE W. GREENSTEIN, Primary Examiner

U.S. Cl. X.R.

99—11, 130, 131, 140; 117—100; 252—316, 522; 264—7; 424—34, 36, 37